May 4, 1954  A. CADELLA  2,677,324
FRUIT CUTTER AND JUICE EXTRACTOR
Filed May 20, 1948 2 Sheets-Sheet 2
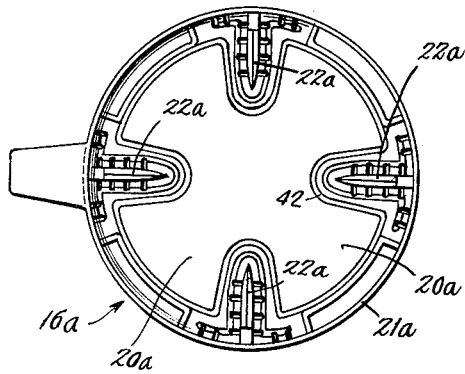
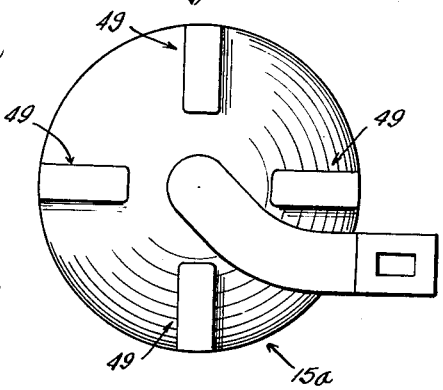
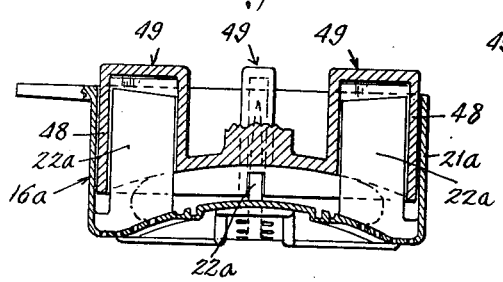
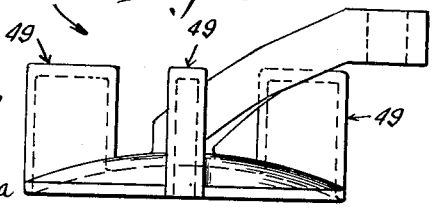
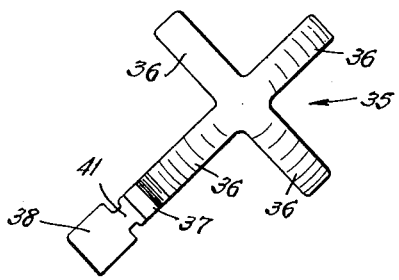
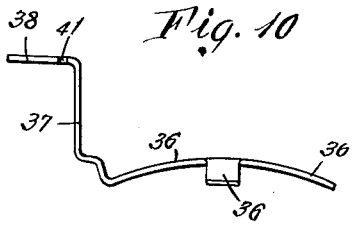
INVENTOR.
Anthony Cadella
BY
Johnson and Kline
ATTORNEYS Patented May 4, 1954

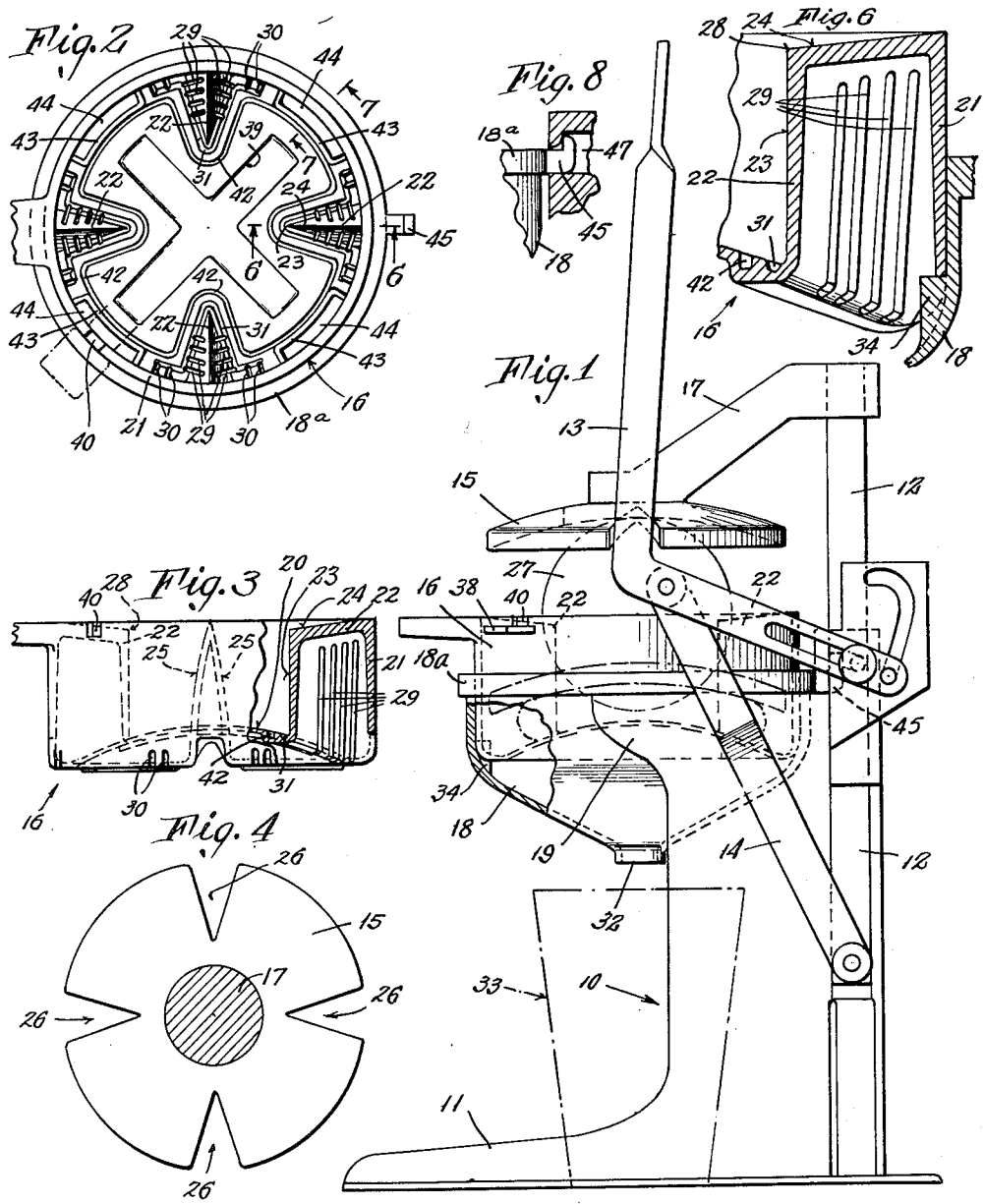

2,677,324

UNITED STATES PATENT OFFICE 2,677,324

FRUIT CUTTER AND JUICE EXTRACTOR

Anthony Cadella, San Leandro, Calif.

Application May 20, 1948, Serial No. 28,233

2 Claims. (Cl. 100—98)

This invention relates to devices for cutting fruit and expressing the juice therefrom, and is concerned particularly with devices which perform the cutting of the fruit and extracting of juice in a single operation.

An object of the invention is to provide an improved, combined fruit cutter and juicer, which is extremely simple and economical in construction and at the same time very effective in removing all of the juice from the fruit, and is also sturdy, and reliable in operation over an extended period of use.

Another object of the invention is to provide an improved cutter and juice extractor as above, which is quick and convenient in operation.

A still further object of the invention is to provide an improved cutter and juice extractor characterized as above, in which removal of the rind or skin of a fruit after the squeezing thereof is quickly and easily accomplished.

Yet another object of the invention is to provide an improved device having the above characteristics, which is very easy to clean after use.

In accomplishing the above objects there is provided by the invention an improved juice extractor comprising a pair of pressure members having opposed faces for engaging opposite sides of a fruit, and having means for causing relative movement of the members in directions toward and away from each other. One of the members carries a plurality of novel cutters which are spaced from the center of the face of the member, and which project in the direction of the other member, and the latter has recesses arranged to clear the cutters when the members are together. Each of the cutters of the one member has sharp edges disposed inward from the marginal portions of the member and extending for the full projected length of the cutter substantially parallel to the path of relative movement of the members when the latter are juxtaposed. Also each cutter has a cutting edge meeting with the said inward edge and extending substantially perpendicular to the said path of movement, for the full width of the cutter.

The cutters, which may be three or four in number or more, are arranged about the center of the face of the member carrying them (which member is preferably the lower one of the pair) and are spaced apart a predetermined distance such that the points formed by the junctions of the inner and the cutting edges provide a temporary cradle whereby a whole orange when inserted in the device will be automatically centrally positioned and correctly held preparatory to the operation of the device. Also by this arrangement of the cutters an extremely effective cutting or slitting action of the fruit skin is had when the pressure members are moved toward each other and initially compress the fruit, causing relatively large juice-discharging openings to be made in the fruit skin so that, as the squeezing of the fruit progresses, the juice will have adequate channels through which to flow.

Preferably the lower member is made in the form of a cup whereby the side or flange aids in the collecting of the juice and prevents it from squirting out, and whereby the cutters may be economically formed integral with the member or cup, as by a simple casting operation, providing for a rigid and sturdy construction capable of economical fabrication in quantities, and capable of long, satisfactory use.

In one form of the invention the cutters are in the shape of solid flat blades of generally rectangular configuration. In another form of the invention the cutters, while having a generally rectangular configuration, are made hollow, with opposite generally flat walls spaced apart, and slots are formed in the walls to provide channels for the discharge from the cup of the expressed juice. In the first-mentioned form of the invention the remaining pressure member, which is cooperable with the member having the cutters, has hollow projecting portions forming the clearance recesses for the cutters, the recesses thus being in the form of pockets closed on all sides but one. By this organization, squirting of juice from the device is eliminated.

The operating or fruit-engaging face of the lower member having the cutters is recessed, and a stripper member is provided, removably carried in the recesses and having a handle for its manipulation. After the extraction of the juice from the fruit, the stripper member may be lifted by its handle, carrying with it the flattened fruit skin and enabling the skin to be conveniently disposed of.

Other features and advantages will hereinafter appear.

In the accompanying drawings:

Figure 1 is a side elevational view of the improved fruit cutter and juice extractor, shown in partly closed position and with a fruit partially cut.

Fig. 2 is a top or plan view of the lower pressure member of the device, having the spaced cutters, the said member being shown supported in a juice collecting cup.

Fig. 3 is a side view partly in elevation and partly in section, of the lower pressure member or cup.

Fig. 4 is a top or plan view of the upper pressure member.

Fig. 5 is a front elevational view of the upper pressure member and the actuating arm therefor.

Fig. 6 is a fragmentary vertical section taken on line 6—6 of Fig. 2.

Fig. 7 is a fragmentary sectional view, enlarged, taken on line 7—7 of Fig. 2.

Fig. 8 is a detail partly in section and partly in elevation showing an interlocking connection between the base or frame of the device, and the juice collecting cup thereof.

Fig. 9 is a top or plan view of the stripper member carried in the lower pressure cup for removing flattened fruit skins therefrom.

Fig. 10 is a side elevational view of the stripper member of Fig. 9.

Fig. 11 is a plan view of a modified lower pressure member, this view being similar to that of Fig. 2 but the member having different type cutters and not being shown positioned in the supporting juice-collecting cup.

Fig. 12 is a top or plan view of a modified form of upper pressure member, especially constructed to prevent squirting of juice from the device.

Fig. 13 is a side elevational view of the upper pressure member of Fig. 12, and

Fig. 14 is a vertical axial sectional view through the upper and lower pressure members of Figs. 11 through 13, when the members are in juxtaposed positions.

Referring to Fig. 1 the improved cutter and juicer of this invention comprises a base 10 having feet 11 by which it is supported on a table surface, and having a vertical slide bar 12 operated by means of a pivoted handle 13 and link 14. The details of the base 10 form no part of the present invention.

In accordance with the present invention the base 10 carries novel cooperable upper and lower pressure members 15 and 16 respectively, the upper member 15 being mounted on a sturdy diagonal arm 17 secured to the upper extremity of the slide bar 12, and the member 16 being carried in a juice-collecting cup 18 having a peripheral flange 18a on its outside, the cup being supported by and between a pair of forwardly-extending arms 19 forming part of the base 10. It will be understood that the base 10 provides a means for causing relative movement between the upper and lower pressure members 15 and 16 in directions toward and away from each other; specifically the base provides for lowering and raising the upper member 15.

Referring to Figs. 2, 3 and 6 the lower pressure member 16 is preferably in the form of a cup having a concavo-convex bottom or fruit-engaging face 20 which presents a convex surface inside the cup, and having a side wall in the form of a cylindrical flange 21. Inside the pressure member or cup 16 a plurality of cutters 22 are provided, here shown as being four in number, the said cutters being of hollow construction and having their opposite sides or walls slightly curved but still substantially flat and spaced apart from each other except at the inner and top edges, where they are joined. The cutters 22 are spaced from and surround the center portion of the bottom 20 of the cup, and project upward from the bottom of the cup in the direction of the pressure member 15 as shown. Each cutter 22 has a sharp edge 23 disposed inward from the wall 21 of the cup and extending, substantially for the full projected length or height of the cutter, vertically or parallel to the path of relative movement of the members. Also, each cutter 22 has a top cutting edge 24 meeting with the inward edge 23 and extending horizontally inward from the side wall 21 of the cup, in a direction substantially perpendicular to the path of relative movement of the members, and it will be noted that each cutting edge 24 extends for the full width of the cutter, from the inner side of the wall 21 to the inward vertical edge 23. While the edges 24 are termed cutting edges, it should be understood that the edges 23 are also sharp and adapted to function as cutting edges, as will be later brought out. In attaining the cutter construction with sharp edges 23 and 24 and spaced walls as described above, the walls are made curved the necessary amount and present convex outer faces 25 as shown in Fig. 3.

Referring to Figs. 1, 4 and 5, the upper pressure member 15 which is cooperable with the cup 16 is preferably in the form of a concavo-convex disk, the concave side being downward for engagement with the top of the fruit. The member 15 has a plurality of V-notches or recesses 26 to enable it to clear the cutters 22 when the members are in juxtaposed positions and compressing a fruit between them, said positions involving a nesting of the upper member in the lower member as shown in broken outline in Fig. 1.

The cutting and squeezing action of the cooperable members 15 and 16 may be readily understood by reference to Fig. 1 wherein a whole fruit 27 is shown positioned between the members and partially cut, the upper member having forced the fruit downward against the cutters 22 a slight distance. It will be understood that the upper pressure member 15 may be raised considerably above the position shown by swinging the handle 13 clockwise as viewed in the figure, thereby to provide adequate clearance between the members to enable the fruit to be readily interposed. Prior to the application of squeezing pressure to the fruit 27, the latter will be automatically correctly positioned or centralized in the cup 16 by engagement with the sharp points 28 formed by the intersections of the cutter edges 23 and 24, and this is an important feature of the invention since it enables a user to completely remove his hands from the fruit prior to operating the device.

After the fruit 27 has been positioned in the cup 16 the handle 13 is grasped and swung forward or counterclockwise as viewed in Fig. 1, whereupon the upper pressure member 15 will be forced downward on the fruit, causing the latter first to be impaled on the four cutters 22, and then enabling the cutters to effectively slit the skin of the fruit. Continued pressure and movement of the upper member 15 results in the slitted fruit being flattened, and causes juice from the fruit to be discharged through the slits in the skin thereof, and the final position of the upper pressure member 15 and of the skin of the fruit 27 is shown in dot-and-dash outline in Fig. 1.

In accordance with the invention, to provide for effective carrying off of the juice expressed from the fruit 27 the walls of the cutters 22 are provided with vertically extending slots 29, which extend to points closely adjacent the uppermost cutting edges 24 of the cutters. The slots 29 are continued in the bottom 20 of the cup for a short distance as shown in Figs. 2 and 6, and additional slots 30 are provided in the cup bottom adjacent the cutters 22. The slots 29 and 30 meet with grooves 31 provided in the bottom 20 of the cup 16, and I have found that by this organization substantially all of the juice expressed from the fruit 27 will be quickly and efficiently discharged from inside the cup 16. To collect such juices in the collecting cup 18 the bottom thereof is made conical and provided with a central discharge opening 32 below which a tumbler 33 may be placed.

For the purpose of accurately and sturdily positioning the pressure cup 16 in the juice-collecting cup 18 the latter is provided with a plurality of lugs 34 which are adapted to extend into the spaces between the side walls of the cutters 22 and to engage the wall or flange 21 of the cup 16.

In accordance with the invention a simple and effective means is provided for extracting the flattened skin of a fruit after the juice has been expressed from the fruit. This means comprises a stripper member 35, Figs. 9 and 10, having substantially the shape of a cross with radially extended arms 36, the extremity of one of said arms having an upstanding extension 37 provided with a tab or handle 38 by which the member 35 may be conveniently manipulated. The bottom 20 of the pressure cup 16 has a recess 39 adapted to receive the arms 36 of the stripper member 35, and the extension 37 thereof is arranged to extend upwardly inside the wall or flange 21 of the cup 16. As shown in Fig. 2, the upper edge of the flange 21 has a notch 40 for receiving a portion 41 of reduced width of the extension 37, thereby to readily position the stripper member 35 correctly in the cup 16. The mere operation of lifting the stripper member 35 by means of the handle 38, after the fruit 27 has been flattened, will raise the fruit skin out of the cup 16 whereby it may be conveniently disposed of.

Also, in accordance with the invention means are provided for preventing oil which is squeezed from the fruit skin from being carried off with the fruit juices. As shown in Figs. 2, 3 and 6, this means comprises a continuous groove 42 provided in the bottom 20 of the pressure cup 16, the groove having circumferential portions extending in parallel inwardly spaced relation to the flange 21 of the cup at points between the cutters 22, and also having V-shaped portions extending along the bases of the cutters in inwardly spaced parallel relation to the juice-collecting grooves 31. During the final steps of the squeezing operation, the oil which is extracted from the underpart of the fruit will be trapped in the groove 42 and will be prevented from passing into the grooves 31 or into the slots 30 and mingling with the fruit juices. Also groove 31 prevents fruit juices moving into the oil groove or channel 42. In addition, the flange 21 of the pressure cup 16 has means in the form of ribs 43 between the circumferential portions of the groove 42 and the flange 21 providing inner pockets 44 on the flange, for collecting oil which squirts from the fruit skin against the inside of the flange.

Referring to Figs. 1 and 8 an improved means is provided for securely positioning the juice-collecting cup 18 on the frame or base 10. This means comprises a projection 45 extending rearwardly from the rim 18a of the cup 18, the said projection being in the form of an upturned hook and extending into a cavity 47 in the base. It will be seen that to remove the cup 18 it is merely necessary to lift the front portion thereof, whereupon the hook or projection 45 will become disengaged from the cavity 47. When the cup 18 is positioned as shown in Fig. 1 it has an interlocking engagement with the base 10 by virtue of the shapes of the hook 45 and cavity 47, and no further means other than the arms 19 on the base, engaging the rim 18a of the cup, need be provided to hold the cup against inadvertent dislodgment.

It will be seen that the lower pressure cup 16 and the cutters 22 carried thereby may be readily formed integral with each other and cast as a single piece thereby providing for a desirable economy in manufacture. Also, all the cooperable parts of the device by which a fruit is cut and juice extracted therefrom are few in number and sturdy and simple in construction whereby further economy of manufacture is attained and whereby reliable operation is had over an extended period of use.

Another form of the invention is shown in Figs. 11 through 14, this form being generally similar to that already described except that the cutters carried by the lower pressure member are made solid instead of hollow, and except that the upper pressure member has portions providing pockets to completely enclose the cutters when the members are together. By this organization there is eliminated any squirting of juice from the device during the squeezing of a fruit.

Referring to Figs. 11 and 14 the cutters 22a shown therein are in the form of generally flat solid blades secured at their lower or base portions to the bottom 20a of the pressure cup 16a. The cutters 22a are spaced from the side wall or flange 21a of the cup 16a to provide clearance for the outer walls 48 of housings or projections 49 extending upward from the top of the upper pressure member 15a and surrounding the slots or recesses therein. When the pressure members 15a and 16a are nested together as shown in Fig. 14 the housings 49 completely encompass the cutters 22a except at their bottom portions. During the squeezing operation, the housings 49 advance over the cutters 22a and act as shields to prevent juice from squirting out of the cup 16a.

Variations and modifications may be made within the scope of this invention and portions of the improvements may be used without others.

I claim:

1. In a fruit juice extractor for fruit of a predetermined substantially standard round shape and size, upper and lower pressure members having opposed faces for engaging the upper and lower sides of said fruit to squeeze the same, means mounting said members for relative movements substantially along a fixed vertical axis coincident to the vertical axis of the fruit, means for causing relative movements of one of said members toward and away from the other substantially along said vertical axis, and a plurality of radially disposed cutters carried by said lower pressure member equally spaced circumferentially, each cutter having an inner cutting edge along its inner side substantially vertically disposed and an upper substantially horizontal continuous cutting edge entirely along its upper end having its inner end meeting the upper end of said inner cutting edge to form an angular sharp fruit supporting corner, said corners coinciding with a circle disposed in a horizontal plane and of a diameter less than the diameter of said fruit and substantially spaced outwardly from said vertical axis to provide a space within said corners within which depends a substantial portion of the lower side of said fruit supported upon said corners with the points of contact of said fruit at a relatively steep angle to said inner cutting edges, said upper cutting edges extending outwardly from said corners substantially beyond the circumference of said fruit and the height of said inner cutting edges being such that the lower side of said fruit supported upon said corners is spaced above said lower pressure member in the open position of said pressure members away from each other whereby as said pressure members are moved toward each other cuts are made in said fruit at circumferentially spaced points below its diametric horizontal plane before said lower side of said fruit contacts said lower pressure member, said upper pressure member having recesses to clear said cutters as the members are carried toward each other in the squeezing of the fruit, said lower pressure member having channels therethrough at the lower ends of said cutters, and said lower pressure member having in its face opposed to said upper pressure member a groove extending about the lower end of each of said cutters in spaced relation thereto and communicating with all of said channels at the lower end of each of said cutters.

2. In a fruit juice extractor for fruit of a predetermined substantially standard round shape and size, upper and lower pressure members having opposed faces for engaging the upper and lower sides of said fruit to squeeze the same, means mounting said members for relative movements substantially along a fixed vertical axis coincident to the vertical axis of the fruit, means for causing relative movements of one of said members toward and away from the other substantially along said vertical axis, and a plurality of radially disposed cutters carried by said lower pressure member equally spaced circumferentially, each cutter having an inner cutting edge along its inner side substantially vertically disposed and an upper substantially horizontal continuous cutting edge entirely along its upper end having its inner end meeting the upper end of said inner cutting edge to form an angular sharp fruit supporting corner, said corners coinciding with a circle disposed in a horizontal plane and of a diameter less than the diameter of said fruit and substantially spaced outwardly from said vertical axis to provide a space within said corners within which depends a substantial portion of the lower side of said fruit supported upon said corners with the points of contact of said fruit at a relatively steep angle to said inner cutting edges, said upper cutting edges extending outwardly from said corners substantially beyond the circumference of said fruit and the height of said inner cutting edges being such that the lower side of said fruit supported upon said corners is spaced above said lower pressure member in the open position of said pressure members away from each other whereby as said pressure members are moved toward each other cuts are made in said fruit at circumferentially spaced points below its diametric horizontal plane before said lower side of said fruit contacts said lower pressure member, said upper pressure member having recesses to clear said cutters as the members are carried toward each other in the squeezing of the fruit, said lower pressure member having channels therethrough at the lower ends of said cutters, and said lower pressure member having in its face opposed to said upper pressure member a groove extending about the lower end of each of said cutters in spaced relation thereto and communicating with all of said channels at the lower end of each of said cutters, and said opposed face having an oil intercepting groove extending about each of said first mentioned grooves in spaced relation thereto.

References Cited in the file of this patent

UNITED STATES PATENTS

| Number | Name | Date |
| --- | --- | --- |
| 61,163 | Clarke | Jan. 15, 1867 |
| 413,725 | Levy | Oct. 29, 1889 |
| 420,368 | Dunlap | Feb. 4, 1890 |
| 620,047 | Neal | Feb. 21, 1899 |
| 1,264,080 | Jennings | Apr. 23, 1918 |
| 1,514,094 | Noble | Nov. 4, 1924 |
| 1,910,559 | Morin | May 23, 1933 |
| 1,944,904 | Read | Jan. 30, 1934 |
| 2,111,997 | Stephens | Mar. 22, 1938 |
| 2,142,975 | Majewski | Jan. 3, 1939 |
| 2,168,430 | Myers | Aug. 8, 1939 |
| 2,174,909 | McCulloch | Oct. 3, 1939 |
| 2,363,798 | McCulloch | Nov. 28, 1944 |
| 2,404,382 | Klein | July 23, 1946 |
| 2,420,680 | Pipkin | May 20, 1947 |
| 2,454,256 | Myers II | Nov. 16, 1948 |